(12) United States Patent
Hayashi

(10) Patent No.: US 6,278,683 B1
(45) Date of Patent: Aug. 21, 2001

(54) OPTICAL RECORDING MEDIUM

(75) Inventor: Kozaburo Hayashi, Kanuma (JP)

(73) Assignee: Sony Chemicals Corp., Tokyo (JP)

( * ) Notice: Subject to any disclaimer, the term of this patent is extended or adjusted under 35 U.S.C. 154(b) by 0 days.

(21) Appl. No.: 09/659,756

(22) Filed: Sep. 11, 2000

(30) Foreign Application Priority Data

Jun. 10, 1999 (JP) ................................. 11-164460

(51) Int. Cl.$^7$ ................. G11B 7/24; G11B 5/66
(52) U.S. Cl. ............... 369/275.5; 428/64.3; 428/694 DE
(58) Field of Search ................. 369/275.1, 275.5, 369/275.2, 257.4, 13, 288; 428/64.3, 64.4, 64.6, 694 ML, 694 SG, 694 DE, 694 SC; 522/31

(56) References Cited

U.S. PATENT DOCUMENTS

| | | | |
|---|---|---|---|
| 4,931,337 | * 6/1990 | Miyazaki et al. | 428/64.8 |
| 5,419,939 | * 5/1995 | Arioka et al. | 428/65.3 |
| 5,578,355 | * 11/1996 | Hirata et al. | 428/64.3 |
| 5,599,649 | * 2/1997 | Shinkai et al. | 430/270.11 |
| 5,620,766 | * 4/1997 | Uchiyama et al. | 428/64.3 |
| 6,121,339 | * 9/2000 | Kominami et al. | 522/31 |

FOREIGN PATENT DOCUMENTS

| | | |
|---|---|---|
| 59-227045 | 12/1984 | (JP) . |
| 7-70472 | 3/1995 | (JP) . |
| 9-147417 | 6/1997 | (JP) . |

* cited by examiner

*Primary Examiner*—Ali Neyzari
(74) *Attorney, Agent, or Firm*—Oliff & Berridge, PLC

(57) ABSTRACT

An optical recording medium is provided, in which there are few warps, and no corrosion in the recording film, even when the protective film of the optical recording medium is made thick. The optical recording medium includes a substrate 2, a recording film 3 formed on the substrate 2, and a protective film 4 formed on the recording film 3, and recording signals can be reproduced optically from the side of the protective film 4. The protective film 4 is a film obtained by curing with UV light irradiation a composition including a cationic polymerizable resin (A) and a cationic polymerization catalyst (B) at a ratio of 100:0.2 to 1.5 by weight. The protective film 4 has a thickness of 20 to 200 $\mu$m.

4 Claims, 1 Drawing Sheet

PRIOR ART

OPTICAL RECORDING MEDIUM

BACKGROUND OF THE INVENTION

1. Field of the Invention

The present invention relates to an optical recording medium in which a substrate, a recording film, and a protective film are layered upon one another, and in which recording signals can be reproduced optically from the protective film side.

2. Description of the Related Art

Ordinary optical recording media have a structure in which a recording film (reflecting film) 3 and a protective film 4 made of an organic resin of about 10 $\mu$m thickness for protecting the recording film 3 are formed on a transparent substrate 2 made for example of polycarbonate, as shown in FIG. 2. The recording film 3 is constituted of pits (convex and concave portions) 3a that are formed on the surface of the substrate 2 and correspond to recording signals, and a reflecting film 3b made of a metal vapor deposition film of, for example, aluminum formed on these pits 3a. To reproduce recording signals recorded on an optical recording medium 1 with this structure, the recording medium 1 is irradiated with laser light 5 from the side of the substrate 2.

With regard to film hardness and durability, it is preferable to use a UV-curing resin for the material constituting the protective film of such an optical recording medium. Examples of known protective films include a protective film made of a so-called radical polymerizable material (Japanese Patent Application Laid-Open No. H7-70472), in which a resin component is polymerized/cured using a radical polymerization catalyst, and a protective film made of a so-called cationic polymerizable material (Japanese Patent Application Laid-Open No. S59-227045), in which a resin component is polymerized/cured using a cationic polymerization catalyst.

Recently, such optical recording media are used not only as audio media, but also as video media, for which the reproduction of vivid video information over long periods of time is required. Therefore, there is a strong demand for optical recording media with higher recording density and better reproduction characteristics.

As one of the related technologies that attempt to respond to these demands, it has been suggested to optically reproduce the recording signals by irradiating the recording medium with laser light not from the transparent substrate side, but from the side of an optically transmissive protective film (Japanese Patent Application Laid-Open No. H9-147417). According to this technology, the thickness of the optically transmissive protective film is set to 0.5 mm (500 $\mu$m) or less, preferably to about 0.1 mm (100 $\mu$m) or less, and on the other hand, the thickness of the substrate is, as conventional, about 1.2 mm. When the protective film is relatively thin compared to the substrate as in this technology, the influence of tilts in the surface (irregularities in the coating) or tilts in the optical recording medium itself can be abated. Therefore, when the recording signals are reproduced by irradiating the recording film with laser light from the side of an optically transmissive protective film, it is reasonable to expect that recording signals that have been recorded at a high density in the recording film can be reproduced better than when the reproduction is carried out from the side of a transparent substrate.

However, although the protective film is thinner than the substrate in the optical recording medium disclosed in Japanese Patent Application Laid-Open No. H9-147417, in which the recording signals are reproduced optically from the protective film side, it is much (about 50 times) thicker than the protective film in conventional optical recording media (ca. 10 $\mu$m).

When such a thick protective film is made using a conventional UV-curing radical polymerizable protective film material, the protective film shows curing shrinkage after the UV light irradiation, and there is the problem of so-called "warping of the optical recording medium". On the other hand, when the optical recording medium uses a protective film made of a cationic polymer material, the influence of curing shrinkage is small, so that the problem of "warping of the optical recording medium" hardly occurs, but there is the problem of "corrosion of the recording film".

SUMMARY OF THE INVENTION

It is an object of the present invention to solve the problems of the related art, and to provide an optical recording medium having a substrate, a recording film formed on the substrate, and a protective film formed on the recording film, in which recording signals can be reproduced optically from the protective film side, and in which warping of the optical recording medium can be reduced and corrosion of the recording film can be prevented, even when the protective film of the optical recording medium is made thick.

These and other objects are accomplished by the following invention.

In accordance with the invention, an optical recording medium, includes:

a substrate;

a recording film formed on the substrate; and a protective film formed on the recording film;

wherein recording signals can be reproduced optically from the protective film side;

the protective film is a film obtained by curing with irradiation of UV light a composition comprising a cationic polymerizable resin (A) and a cationic polymerization catalyst (B) at a ratio of 100:0.2 to 1.5 by weight; and the protective film has a thickness of 20 to 200 $\mu$m.

DESCRIPTION OF THE PREFERRED EMBODIMENTS

Figure 1:
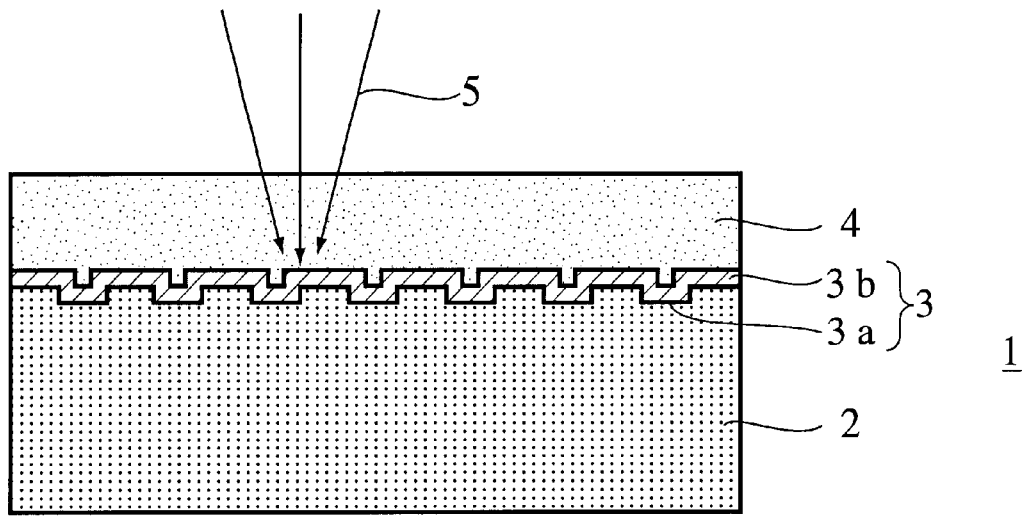
FIG. 1 is a cross-sectional view of an optical recording medium in accordance with the present invention.
Figure 2:
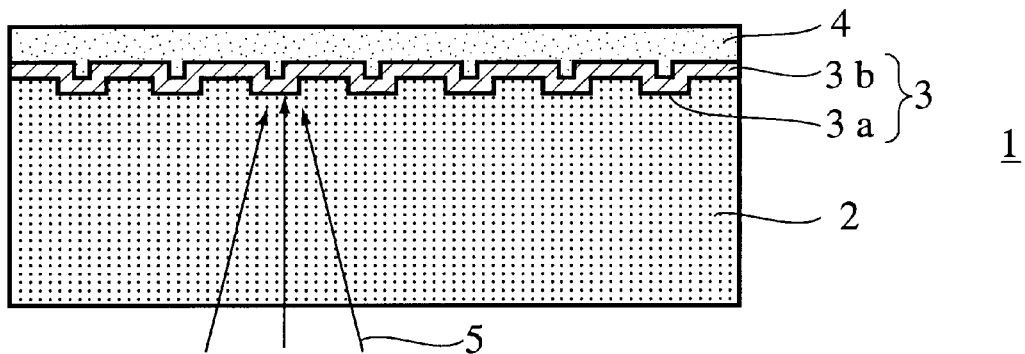
FIG. 2 is a cross-sectional view of a conventional optical recording medium.

The following is a detailed explanation of an optical recording medium in accordance with the present invention, with reference to FIG. 1.

An optical recording medium 1 in accordance with the present invention includes a substrate 2, a recording film 3 formed on the substrate 2, and a protective film 4 formed on the recording film 3. Recording signals can be reproduced optically from the side of the protective film 4. The recording film 3 includes pits (concave and convex portions) 3a formed on the surface of the substrate 2 and corresponding to the recording signals, and an optically reflecting film 3b made of a metal deposition film of, for example, aluminum is formed on those pits 3a.

The protective film 4 of the optical recording medium 1 of the present invention is obtained by curing with UV light irradiation a composition including a cationic polymerizable resin (A) and a cationic polymerization catalyst (B) at a ratio of 100:0.2–1.5 by weight, and the protective film 4 has a thickness of 20 to 200 μm. With this characteristic structure, warping of the optical recording medium 1 due to the curing shrinkage can be reduced and corrosion of the recording film 3 can be prevented, even when the protective film 4 is thicker than in a conventional optical recording medium. The reason for this is discussed in the following.

To prevent curing shrinkage which occurs when the protective film of the optical recording medium is made thick, the present invention uses a cationic polymer material, which hardly shrinks during the curing. The cause for the "corrosion of the recording film" is considered to be that the cationic polymerization catalyst itself, which can generally be classified as an organic salt, remains as an ionic material in the protective film and that, when the protective film is made thick, the absolute amount of ionic material in the protective film becomes large. Consequently, in addition to limiting the amount of the cationic polymerization catalyst that is suitable to promote the cationic reaction, it is necessary to limit the thickness of the protective film to restrict the absolute amount of ionic material in the protective film while ensuring the necessary mechanical properties of the protective film.

In the present invention, the substrate 2 functions as a support for the optical recording medium 1. It is preferable to use a plastic sheet, for example of polycarbonate, for the substrate 2.

Since in the present invention the recorded information is read from the side of the protective film 4, the substrate 2 does not necessarily have to be transparent. Consequently, it is possible to apply a printed decoration to the substrate 2.

The thickness of the substrate 2 should be decided in consideration of the strength of the entire optical recording medium 1 and the thickness of the protective film 4, but generally, a thickness of 1.2 mm, which is the industry standard for optical recording media, is adequate.

The pits (concave and convex portions) 3a constituting the recording film 3 can be formed using any of the well-known methods, such as by photolithography on the substrate 2. Also the optically reflecting film 3b can be made using any of the well-known methods, such as by vapor deposition of aluminum. When aluminum is used, the thickness of the optically reflecting film 3b is ordinarily 30 nm to 100 nm.

For the cationic polymerizable resin (A) used to make the protective film 4, it is possible to use an oligomer or a resin having a cationic polymerizable group (for example, ethylene oxide, vinyl ether, or isobutylene group) in the molecule. It is also possible to use a cationic polymerizable monomer together therewith. Among these, it is preferable to use a so-called epoxy resin, which includes ethylene oxide.

For the epoxy resin, it is possible to use for example a bisphenol A-type epoxy resin or a bisphenol F-type epoxy resin which can be obtained by reacting epichlorohydrine with bisphenol A, bisphenol F or the like, or an epoxy resin obtained by hydrogenating these.

It is also possible to use an alicyclic epoxy resin, such as vinyl cyclo-hexenedioxide, 3,4-epoxycyclohexylmethyl-3, 4-epoxycyclohexanecarboxylate, or bis(3,4-epoxycyclohexyl) adipate.

Suitable examples of the cationic catalyst (B) used to make the protective film 4 include proton or acids emitting their own protons, and Lewis acids emitting carbonium ions or their complexes. Among these, Lewis acid salts with low corrosiveness with respect to metals can be used preferably. Preferable examples include aromatic diazonium salts, aromatic sulfonium salts, aromatic iodonium salts, and aromatic selenium salts.

For the cationic polymerization catalyst (B) as mentioned above, it is possible to use any of the products available on the market, such as, to be specific, SP-150 or SP-170 (by Asahi Denka Kogyo K.K.), UVE1041 (by General Electrics, Ltd.), or FC-509 (by 3M Co.) for the aromatic sulfonium salt, and PP-30 (by Asahi Denka Kogyo K.K.) for the aromatic diazonium salt.

In the present invention, the ratio of the cationic polymerizable resin (A) and the cationic polymerization catalyst (B) is 100:0.2–1.5 by weight, preferably 100:0.5–1.0 by weight. If the catalyst (B) is less than 0.2 parts by weight with respect to 100 parts by weight of the resin (A), then the reaction becomes insufficient, and the protective film remains sticky (viscous), and if it exceeds 1.5 parts by weight, then corrosion of the recording film can be observed, leading to problems during actual use.

Considering the mechanical strength of the entire optical recording medium and the durability with respect to irradiation of laser light, the thickness of the protective film 4 should be at least 20 μm. On the other hand, to suppress corrosion of the recording film, it should be not more than 200 μm.

The formation of the protective film 4 can be carried out with any of the well-known film-forming methods, such as spin-coating. The protective film material can be manufactured by processing with a transfer sheet, as described in JP H9-147417A.

In the recording medium of the present invention, pits corresponding to the recording signal are formed on the substrate surface with one of the usual methods, and the recording film is formed by vapor depositing a metal, such as aluminum, on the surface of the substrate that is provided with the pits to form an optically reflective film. Then, a composition including a cationic polymerizable resin (A) and a cationic polymerization catalyst (B) is applied, for example by spin-coating, on the recording film, and a protective film is formed by polymerizing this composition by irradiation with UV light. Thus, the optical recording medium in FIG. 1 is obtained.

To reproduce the recording signals recorded in the recording layer of the optical recording medium of the present invention, irradiation with reproduction laser light 5 is performed from the side of the protective film 4, as shown in FIG. 1, which makes the reproduction very efficient. If a transparent substrate is used, it is also possible to reproduce the recording signals by irradiation with laser light from the substrate side.

EXAMPLES

The present invention will be explained in more detail, referring to specific examples.

Examples 1 to 9 and Comparative Examples 1 to 5
Preparation of the Composition for the Protective Film of the Optical Recording Medium A composition for the protective film was prepared by mixing the components listed in Tables 1 to 3 with a stirrer.
Manufacture of the Optical Recording Medium Pits (convex and concave portions) corresponding to the recording signals were formed on the surface of a 1.2 mm thick polycarbonate substrate. Then, a recording film was formed by vapor-depositing aluminum to a thickness of 50 nm on these pits. On this recording film, the aforementioned composition for the protective film was applied by spin-coating. Subsequently, a cation reaction was initialized by irradiation with UV light at an energy density of 500 mJ/cm² from the side to which the composition has been applied, and the reaction was allowed to terminate (which takes about 1 hour). Thus, an optical recording medium with the structure shown in FIG. 1 was obtained.

The thickness of the protective film of the optical recording medium was set to 100 µm in all examples and comparative examples except for Example 8 (20 µm) and Example 9 (200 µm)

Evaluation Methods

The compositions for the protective film obtained with the examples and comparative examples or the resulting optical recording media were evaluated with regard to (i) corrosion of the recording film, (ii) curing shrinkage, and (iii) curability. The results of these evaluations are listed in Tables 1 to 3.

(i) Corrosion of the Recording Film

The optical recording medium was kept for 100 ours in a constant temperature vessel at 80° C. and 85% humidity. Then, pinholes in the 12 cm diameter disk were counted using a microscope. As for the classification, 0 to 10 pinholes were regarded as "A", 11 to 50 pinholes were regarded as "B", 51 to 100 pinholes were regarded as "C", and more than 100 pinholes were regarded as "D". Thus, a classification of "A" indicates a level at which there is practically no corrosion of the recording film, so that there is no influence on reproduction. A classification of "B" indicates that corrosion of the recording film can be acknowledged, but at a level that poses no problem in practice.

Classifications of "C" or "D", on the other hand, indicate that corrosion of the recording film can be acknowledged at a level that influences reproduction.

(ii) Curing Shrinkage

The density of the composition for the protective film, as well as the density of the material that results when this composition has been cured was measured, and the curing shrinkage was determined from the following equation:

$$\text{curing shrinkage degree} = (1 - \text{composition density/cured density}) \times 100\% \quad (Eq.1)$$

(iii) Curability

After the protective film has been irradiated with UV light, the curability of the protective film was determined by examining the extent of its "stickiness". Generally, when the protective film is sufficiently cured, its surface is not sticky. When the protective film is sticky, dust and dirt may adhere to it and influence the reproduction of the recording signals. Here, paper flakes of 1 mm size were scattered uniformly on the surface of the protective film after the UV irradiation, and it was determined whether paper flakes remain on the disk after rotating the disk (at 3000 rpm). When all paper flakes were removed from the disk, the evaluation was "○", and when paper flakes remained on the disk, the evaluation was "X".

The tradenames and the manufacturers of the components mentioned in the Tables 1 to 3 are listed below:

*1 YD8125 by Toto Kasei K.K.
*2 YDF8170C by Toto Kasei K.K.
*3 2021P by Daicel Kagaku K.K.
*4 XDO by Toa Gosei K.K.
*5 SP170 (50% solid) by Asahi Denka K.K.
*6 UVI6990 (50% solid) by UCB
*7 RS2074 (100% solid) by Rhone-Poulenc
*8 CN120 by Sartomer
*9 APG200 by Shin-Nakamura Kagaku K.K.
*10 HDDA by Shin-Nakamura Kagaku K.K.
*11 IRG184 by Chiba Speciality Chemicals

TABLE 1

| Components (all figures in parts by weight) | Ex. 1 | Ex. 2 | Ex. 3 | Ex. 4 | Ex. 5 |
|---|---|---|---|---|---|
| cationic polymerizable resin (A) | | | | | |
| bisphenol A-type epoxy resin (*1) | 30 | 30 | 30 | 30 | 30 |
| bisphenol F-type epoxy resin (*2) | 50 | 50 | 50 | 50 | 50 |
| alicyclic epoxy resin (*3) | 20 | 20 | 20 | 20 | 20 |
| catalyst (B) | | | | | |
| cationic polymerizaiton catalyst (*5) | 0.25 | 0.5 | 1.0 | 1.5 | — |
| cationic polymerization catalyst (*6) | — | — | — | — | 1.0 |
| Evaluation | | | | | |
| (i) corrosion of recording film | A | A | A | B | A |
| (ii) curing shrinkage (%) | 3.5 | 3.6 | 3.6 | 3.7 | 3.5 |
| (iii) curability | ○ | ○ | ○ | ○ | ○ |

TABLE 2

| Components (all figures in parts by weight) | Ex. 6 | Ex. 7 | Ex. 8 | Ex. 9 |
|---|---|---|---|---|
| cationic polymerizable resin (A) | | | | |
| bisphenol A-type epoxy resin (*1) | 30 | 20 | 30 | 30 |
| bisphenol F-type epoxy resin (*2) | 50 | — | 50 | 50 |
| alicyclic epoxy resin (*3) | 20 | — | 20 | 20 |
| oxetan resin (*4) | — | 80 | — | — |
| Catalyst (B) | | | | |
| cationic polymerizable catalyst (*5) | — | 1.0 | 1.0 | 1.0 |
| cationic polymerizable catalyst (*7) | 1.0 | — | — | — |
| Evaluation | | | | |
| (i) corrosion of recording film | A | A | A | A |
| (ii) curing shrinkage (%) | 3.7 | 3.4 | 3.3 | 3.7 |
| (iii) curability | ○ | ○ | ○ | ○ |

TABLE 3

| Components (all figures in parts by weight) | Comp. Ex. 1 | Comp. Ex. 2 | Comp. Ex. 3 | Comp. Ex. 4 | Comp. Ex. 5 |
|---|---|---|---|---|---|
| cationic polymerizable resin (A) | | | | | |
| bisphenol A-type epoxy resin (*1) | 30 | 30 | 30 | 30 | — |
| bisphenol F-type epoxy resin (*2) | 50 | 50 | 50 | 50 | — |
| alicyclic epoxy resin (*3) | 20 | 20 | 20 | 20 | — |
| radical polymerizable resin composition | | | | | |
| epoxy acrylate (*8) | — | — | — | — | 40 |
| Tripropyleneglycol-diacrylate (*9) | — | — | — | — | 40 |
| 1,6-hexanedioldiacrylate (*10) | — | — | — | — | 20 |
| catalyst (B) | | | | | |
| cationic polymerizable catalyst (*5) | 0.1 | 2.0 | — | — | — |
| cationic polymerizable catalyst (*6) | — | — | — | 2.0 | — |
| cationic polymerizable catalyst (*7) | — | — | 2.0 | — | — |
| cationic polymerizable | — | — | — | — | 5 |

TABLE 3-continued

| Components (all figures in parts by weight) | Comp. Ex. 1 | Comp. Ex. 2 | Comp. Ex. 3 | Comp. Ex. 4 | Comp. Ex. 5 |
|---|---|---|---|---|---|
| catalyst (*11) | | | | | |
| Evaluation | | | | | |
| (i) corrosion of recording film | B | D | D | D | A |
| (ii) curing shrinkage (%) | 3.5 | 3.8 | 3.8 | 3.6 | 8.5 |
| (iii) curability | X | ○ | ○ | ○ | ○ |

Conclusions

From the Tables 1 to 3, it can be seen that the number of pinholes in the optical recording medium of Example 1 falls under the category "A", and there is almost no corrosion of its recording film. Moreover, it can be seen that the surface of the protective film is not sticky, and the curing has been promoted sufficiently. Moreover, its curing shrinkage is with 3.5% at a practical level, although the protective film is made thicker than an ordinary protective film.

Furthermore, it can also be seen from Tables 1 to 3, that the number of pinholes in the protective films of the Examples 2 to 7 is small, and there is little corrosion of the recording film.

Moreover, when the amount of the cationic polymerization catalyst (B) is 1.5 parts by weight for 100 parts by weight of the cationic polymerizable resin (A) (Example 4), the number of pinholes falls under category "B", whereas when the amount of the cationic polymerization catalyst (B) is 2.0 parts by weight (Comparative Examples 2, 3, and 4), the number of pinholes falls under category "D", so that 1.5 parts by weight can be determined to be a clear critical point for the addition amount of the cationic polymerization catalyst (B) at the thicknesses of the protective layer of the present invention. Moreover, even when different cationic polymerization catalysts (B) are used (Examples 3, 5, and 6, and Comparative Examples 2, 3, and 4), there is no difference in the number of pinholes, which means that the amount of the catalyst is dominant over the kind of catalyst.

When the amount of the cationic polymerization catalyst was 0.1 parts by weight (Comparative Example 1), the curing reaction is not promoted sufficiently, so that the curability is insufficient.

Moreover, it can be seen that in spite of the changed thickness of the protective film in the optical recording media of Examples 8 and 9 of the present invention, the number of pinholes falls under category "A", and there is almost no corrosion of the recording film. Furthermore, it can be seen that the protective film is not sticky, and the curing has been promoted sufficiently. Also, the protective films in the Examples 8 and 9 are made thicker than regular protective films, but it can be seen that their curing shrinkage is with 3.3% (Example 8) and 3.7% (Example 9) at a practical level.

In Comparative Example 5, in which a protective film made of a radical polymer material is used, the number of pinholes in the protective film falls under category "A" and there is almost no corrosion of the recording film, but it can be seen that the curing shrinkage is with 8.5% high, and exceeds the range that is acceptable for practical applications. Consequently, it can be seen that radical polymerizable material is not suitable for making the protective film thick as in the present invention.

The present invention provides an optical recording medium, in which the thickness of the protective layer can be selected as appropriate when reproducing recording signals from the protective film side of the optical recording medium, and in which selecting the amount of a suitable catalyst for this thickness solves the problem of warps in the optical recording medium and the problem of corrosion of the recording film.

Moreover, the protective film of the optical recording medium of the present invention cures sufficiently, and is not sticky so that it does not gather dust or dirt, which is suitable for reading the recording signals from the protective film side.

The entire disclosure of the specification, claims, summary and drawings of Japanese Patent Application No. 11-164460 filed on Jun. 10, 1999 is hereby incorporated by reference.

What is claimed is:

1. An optical recording medium, comprising:
   a substrate;
   a recording film formed on the substrate;
   a protective film formed on the recording film;
   wherein recording signals can be reproduced optically from the protective film side;
   the protective film is a film obtained by curing with UV light irradiation a composition comprising a cationic polymerizable resin (A) and a cationic polymerization catalyst (B) at a ratio of 100:0.2 to 1.5 by weight; and
   the protective film has a thickness of 20 to 200 $\mu$m.

2. The optical recording medium according to claim 1, wherein the composition comprises the cationic polymerizable resin (A) and the cationic polymerization catalyst (B) at a ratio of 100:0.5 to 1.0 by weight.

3. The optical recording medium according to claim 1, wherein the cationic polymerizable resin (A) is an oligomer or a resin having a cationic polymerizable group in the molecule, and the cationic polymerization catalyst (B) is proton or an acids emitting their own protons, or Lewis acids emitting carbonium ions or their complexes.

4. The optical recording medium according to claim 1, wherein the cationic polymerizable resin (A) is an epoxy resin, and the cationic polymerization catalyst (B) is a Lewis acid salt.

* * * * *